United States Patent

Goodman

(10) Patent No.: US 7,694,098 B2
(45) Date of Patent: Apr. 6, 2010

(54) SYSTEM AND METHODS FOR AVOIDING BASE ADDRESS COLLISIONS

(75) Inventor: Kevin J. Goodman, Alpharetta, GA (US)

(73) Assignee: RTO Software, Inc., Alpharetta, GA (US)

( * ) Notice: Subject to any disclaimer, the term of this patent is extended or adjusted under 35 U.S.C. 154(b) by 0 days.

(21) Appl. No.: 12/206,780

(22) Filed: Sep. 9, 2008

(65) Prior Publication Data

US 2009/0077335 A1    Mar. 19, 2009

Related U.S. Application Data

(63) Continuation of application No. 11/376,705, filed on Mar. 15, 2006, now Pat. No. 7,461,228, which is a continuation of application No. 10/719,781, filed on Nov. 21, 2003, now Pat. No. 7,058,775, which is a continuation of application No. 10/062,619, filed on Jan. 31, 2002, now Pat. No. 6,950,916.

(51) Int. Cl.
    *G06F 12/00* (2006.01)
(52) U.S. Cl. .................................... 711/165
(58) Field of Classification Search .................. None
    See application file for complete search history.

(56) References Cited

U.S. PATENT DOCUMENTS

| | | | |
|---|---|---|---|
| 4,758,951 A | 7/1988 | Sznyter, III | |
| 5,809,330 A * | 9/1998 | Ninomiya | ..................... 710/9 |
| 5,875,487 A | 2/1999 | Schwartz et al. | |
| 5,940,868 A | 8/1999 | Wagner | |
| 5,943,066 A | 8/1999 | Thomas et al. | |
| 5,960,466 A | 9/1999 | Belgard | |
| 6,047,362 A | 4/2000 | Zucker | |
| 6,061,773 A | 5/2000 | Harvey et al. | |
| 6,065,104 A | 5/2000 | Tng | |
| 6,105,117 A | 8/2000 | Ripley | |
| 6,205,580 B1 | 3/2001 | Hirose | |
| 6,253,258 B1 | 6/2001 | Cohen | |
| 6,304,951 B1 | 10/2001 | Mealey et al. | |
| 6,681,329 B1 | 1/2004 | Fetkovich et al. | |
| 6,792,499 B1 * | 9/2004 | Eldredge | ..................... 711/5 |
| 7,058,775 B2 | 6/2006 | Goodman | |

OTHER PUBLICATIONS

Riemersma, Thiadmer, "Rebasing Win32 DLLs," http://www.ddj.com/windows, Dec. 1, 2000, 8 pages.

* cited by examiner

*Primary Examiner*—Brian R Peugh
(74) *Attorney, Agent, or Firm*—Kilpatrick Stockton LLP

(57) ABSTRACT

Processes are monitored as components are loaded into memory. Relocation of a component to an alternate base address instead of its preferred base address, causes an alternate component to be created corresponding to the relocated component. The alternate component is a copy of the relocated component, but the preferred base address of the alternate component is reset to be the alternate base address of the relocated component. Additional alternate components may be created for each relocated component, with each additional alternate component being optimized in a different manner. Alternate components may be implemented as alternate data stream of the corresponding relocated components. In response to subsequent requests to load a selected component into memory, it is determined whether the selected component has at least one corresponding alternate component. If so, one of the corresponding alternate components is loaded into memory instead of the selected component.

13 Claims, 7 Drawing Sheets

SYSTEM AND METHODS FOR AVOIDING BASE ADDRESS COLLISIONS

RELATED APPLICATIONS

The present application is a continuation of co-pending of U.S. patent application Ser. No. 11/376,705, entitled "System and Methods for Avoiding Base Address Collisions" and filed Mar. 15, 2006, which is a continuation of U.S. patent application Ser. No. 10/719,781, entitled "Systems and Methods for Avoiding Base Address Collisions Using Alternate Components" and filed Nov. 21, 2003 and which issued on Jun. 6, 2006 as U.S. Pat. No. 7,058,775, which claims the benefit of U.S. Pat. No. 6,950,916, entitled "Dynamically Setting the Optimal Base Addresses of Process Components," all of which are entirely incorporated herein by reference.

TECHNICAL FIELD

The present invention relates generally to the elimination or reduction of base address collisions in computer software programs. More particularly, the present invention relates to the use of alternate data streams for setting the optimal base address of process components in order to eliminate or reduce base address collisions.

BACKGROUND OF THE INVENTION

A computer's operating system, such as the Microsoft Windows operating system ("Windows"), may be configured to specify that each process have its own private virtual address space. By way of example, Windows uses a technique known as memory-mapping to load the components of a process (such as the executable file and any associated dynamic link libraries) from persistent storage (e.g., disk or tape) into memory (e.g., random access memory ("RAM")). In order to allow memory-mapping to operate more efficiently, each component of a process may be assigned what is known as a preferred base address within the memory. As is known in the art, it is possible to set the preferred base address of a component at design time.

While many developers do set preferred base addresses at design time, this process does not ensure that a component will always load at its preferred base address. For example, an operating system may not be able to load a component of a process at its preferred base address if the operating system has already loaded some other process component at that address. If any component of the process cannot be loaded into memory at its preferred base address, the operating system must perform additional logic to relocate that component to a different location in memory. The process of relocating a component consumes valuable time and memory resources.

Thus, there remains a need for ensuring that components of a process load at their preferred base addresses. There further remains a need for optimally determining the correct preferred base addresses of a component prior to run time.

SUMMARY OF THE INVENTION

The present invention meets the needs described above by providing systems and methods for attempting to ensure that some or all components of a process load at their preferred base addresses. In one embodiment, the present invention detects that a process has been loaded from persistent storage into memory. The present invention then determines if any of the original components of the process have been relocated by the operating system to an alternate base address instead of that original component's preferred base address. At least a first alternate component is created corresponding to each relocated original component.

Each first alternate component is a copy of its corresponding relocated original component, but the preferred base address of each first alternate component is reset to be the alternate base address of its corresponding relocated original component. Optionally a second alternate component may also be created corresponding to each relocated original component. A second alternate component may be another duplicate of the selected original component with its preferred base address reset to the alternate base address and may also be bound to the alternate base address. Additional alternate components may be created for each relocated original component, with each additional alternate component being optimized in a different manner. Alternate components may be implemented as alternate data stream of their corresponding relocated original components.

In response to a request to load a selected original component into memory, a determination is made as to whether the selected original component has at least one corresponding alternate component. If so, one of the corresponding alternate components is loaded into memory instead of the selected original component. Loading one of the corresponding alternate components into memory in response to the request may involve, for example, intercepting the request and modifying it to substitute therein an identifier of the first alternate component or an identifier of another alternate component for an identifier of the selected original component. The modified request may then be passed to a file system driver for processing.

These and other aspects, features and advantages of the present invention may be more clearly understood and appreciated from a review of the following detailed description of the disclosed embodiments.

DETAILED DESCRIPTION OF EXEMPLARY EMBODIMENTS OF THE INVENTION

The present invention is directed to systems and methods for monitoring the initialization of a software process in order to determine if all of the components of the process load at their preferred base addresses. Should any component of the process load at a new base address, as opposed to its preferred base address, the on-disk representation of that component may be updated to reflect the new base address. In other words, the preferred base address of the component may be re-set to the new base address. Thus, the next time a request is made to open the component for execution, it will load at the new base address and a base address collision should be avoided.

In certain alternative embodiments, the original on-disk representation of a process component may be left in tact and an alternate data stream may be created. The alternate data stream may be a duplicate of the component with its preferred base address set to the new base address. A base address collision should be avoided by loading the alternate data stream into memory (at the new base address) instead of the original on-disk representation of the component (at the original preferred base address) in response to subsequent requests to open the component for execution. A file system filter driver or other software program module may be used to redirect such requests to the alternate data stream.

Figure 1:
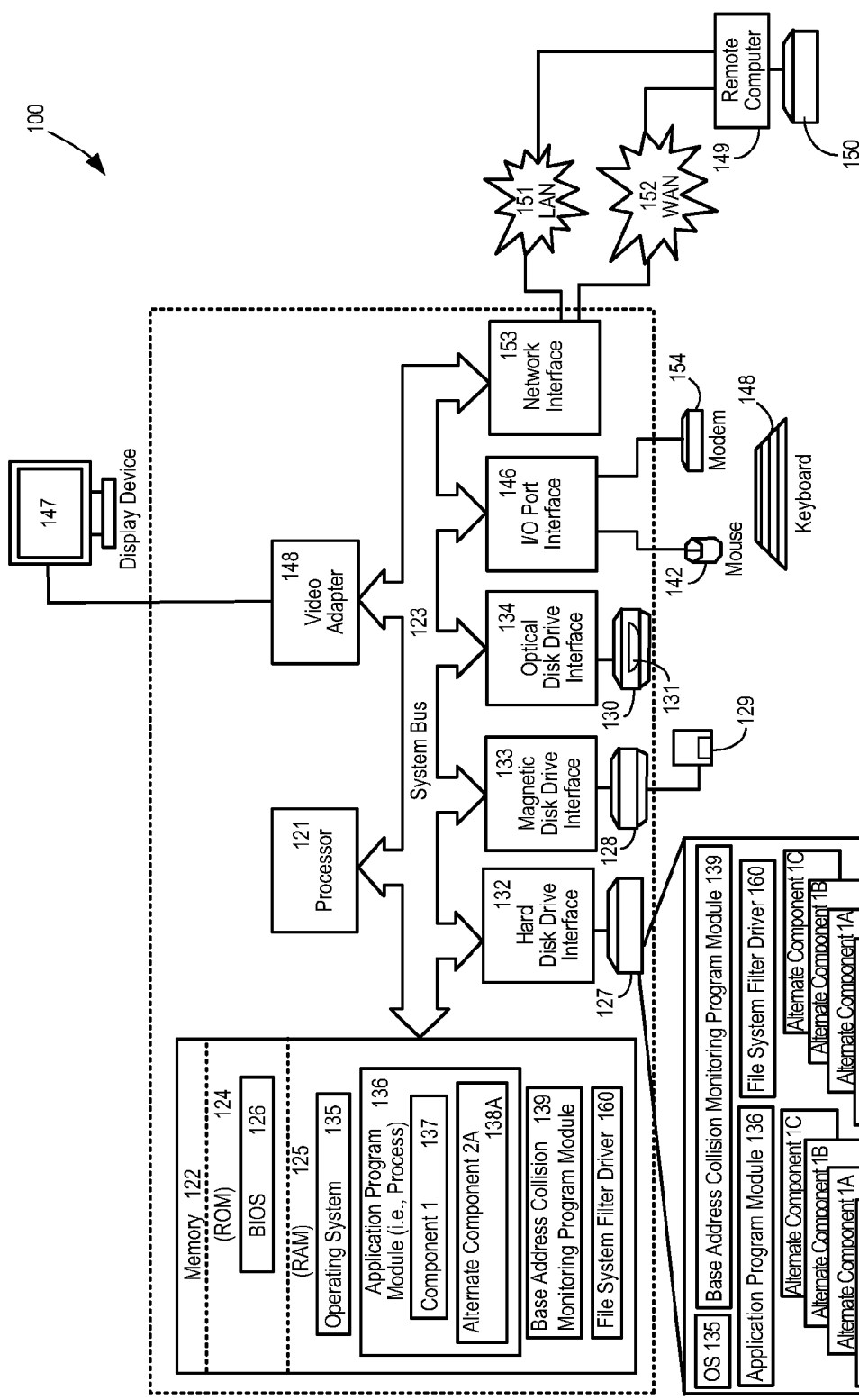
FIG. 1 is a block diagram of a personal computer system, illustrating an exemplary operating environment for implementation of certain illustrative embodiments of the present invention.

The following description will hereinafter refer to the drawing, in which like numerals indicate like elements throughout the several figures. FIG. 1 and the following discussion are intended to provide a brief and general description of a suitable computing environment for implementing the present invention. Although the system shown in FIG. 1 represents a conventional personal computer system 100, those skilled in the art will recognize that the invention also may be implemented using other types of computer system configurations. The computer system 100 includes a processing unit 121, a system memory 122 and a system bus 123 that couples the system memory 122 to the processing unit 121. The system memory 122 includes read only memory (ROM) 124 and random access memory (RAM) 125. A basic input/output system 126 (BIOS), containing basic routines that help to transfer information between elements within the personal computer system 100, such as during start-up, is stored in ROM 124.

The personal computer system 100 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 100. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the persistent storage devices (e.g., hard disk drive 127) and the memory 122 (e.g., RAM 125), including an operating system 135, one or more application program module 136, and other program modules 137 and 138. Program modules 137 and 138 may comprise components of the application program module 136. An application program module 136 is also referred to generally as a process. The present invention may be implemented, at least in part, as a program module referred to herein as the Base Address Collision Monitoring Program Module 139, comprising computer-executable instructions for performing some or all of the methods described below with respect to FIG. 2, FIG. 3 and FIG. 4. Certain embodiments of the invention may also rely on a program module referred to herein as the Alternate Component Filter 160, comprising computer-executable instructions for performing the methods described below with respect to FIG. 6.

Other input devices (not shown) may include a microphone, joystick, game pad, satellite dish, scanner, or the like. These and other input devices are often connected to the processing unit 121 through a serial port interface 146 that is coupled to the system bus 123, but may be connected by other interfaces, such as a game port or a universal serial bus (USB). A display device 147 is also connected to the system bus 123 via an interface, such as a video adapter 148. In addition to display device, personal computer systems typically include other peripheral output devices (not shown), such as speakers or printers.

The personal computer system 100 may operate in a networked environment using logical connections to one or more remote computer systems, such as a remote computer system 149. The remote computer system 149 may be a server, a router, a peer device or other common network node, and typically includes many or all of the elements described above relative to the personal computer system 100, although only a storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 100 is connected to the LAN 151 through a network interface 153. When used in a WAN networking environment, the personal computer system 100 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 100, or portions thereof, may be stored in the remote memory storage device. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Figure 2:
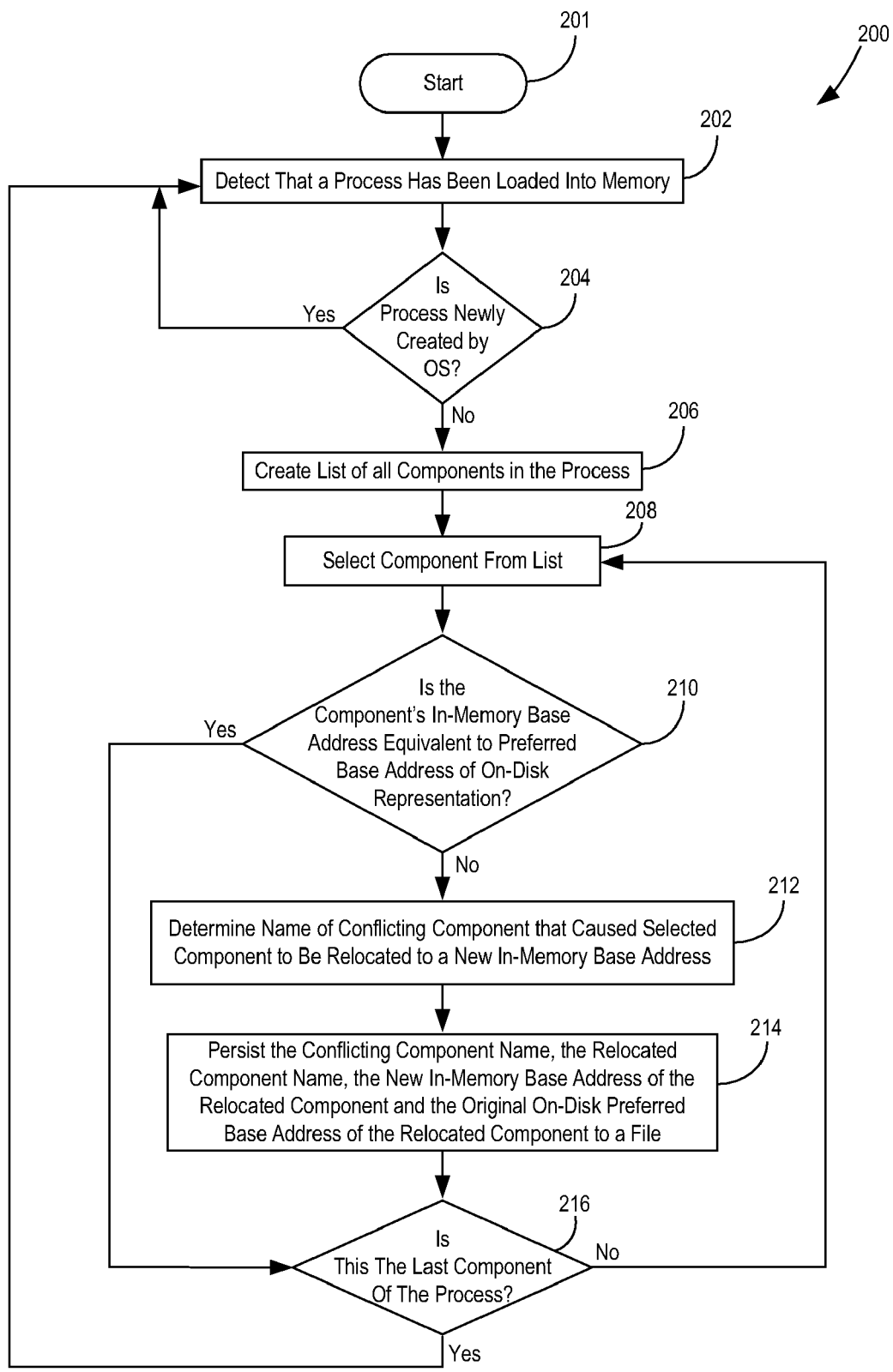
FIG. 2 is a flow chart illustrating an exemplary method for determining if any of the components of a process are relocated to a new base address.

FIG. 2 is a flow chart illustrating an exemplary method 200 for monitoring the loading of a process 136 into memory 122 in order to determine if any of the components 137, 138 of the process 136 are relocated to a new base address. The method 200 begins at starting block 201, where a computer system, such as the computer 100 of FIG. 1, initializes one or more software processes, such as the application program 136 of FIG. 1. At step 202, it is detected that the operating system 135 of the computer 100 has loaded a process 136 into memory 122. At step 204, it is determined whether the process 136 loaded into memory 122 has been newly created by the operating system 135 (i.e., whether the process 136 was loaded into memory 122 within a specified time limit). If the process 136 has been newly created by the operating system 135, the method returns to step 202 to await detection of the loading of another process 136. A newly created process 136 is skipped, for the time being, because it is likely that a significant number of its components 137, 138 have not yet been loaded into memory 122. However, if the process 136 being loaded into memory 122 is not newly created by the operating system 135, the method advances to step 206, where a list is created to enumerate all of the components 137, 138 in the process 136.

At step 208, a first component 137 is selected from the list of components of the process 136. Then at step 210, a determination is made as to whether the in-memory base address of the selected component 137 is equivalent to the on-disk representation of its preferred base-address. If the in-memory base address of the selected component 137 is equivalent to the on-disk representation of its preferred base-address, the method advances to step 216 for a determination as to whether the selected component 137 is the last component in the list of process components. However, if at step 210 the in-memory base address of the selected component 137 is determined not to be equivalent to the on-disk representation of its preferred base-address (i.e., the selected component 137 has been relocated to a new in-memory base address due to a conflicting component or other file having previously been loaded at the preferred base address of the selected component 137), the name of the conflicting component is determined at step 212.

Figure 3:
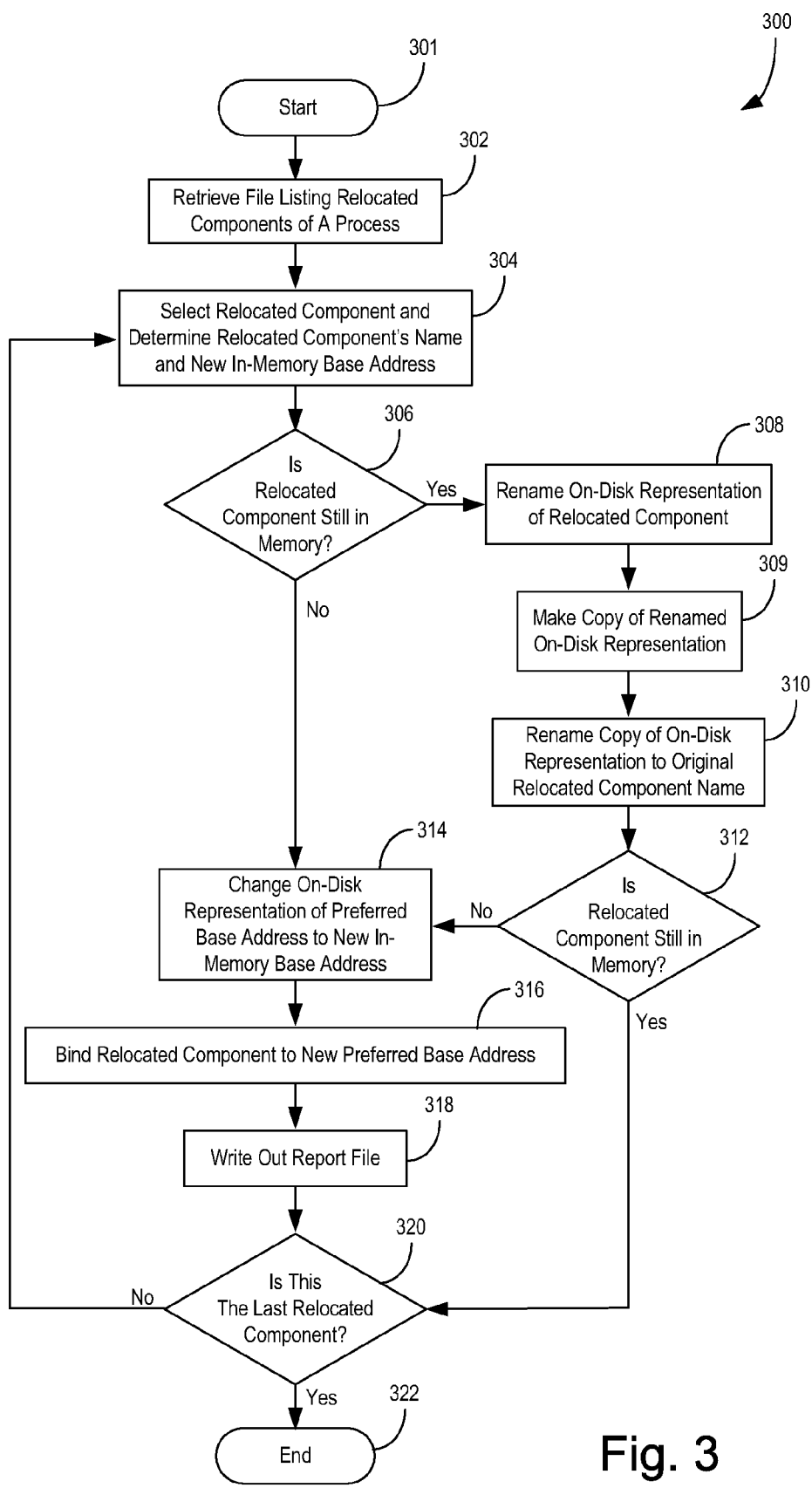
FIG. 3 is a flow chart illustrating an exemplary method for dynamically updating a component's preferred base address in accordance with certain illustrative embodiments of the present invention.
Figure 4:
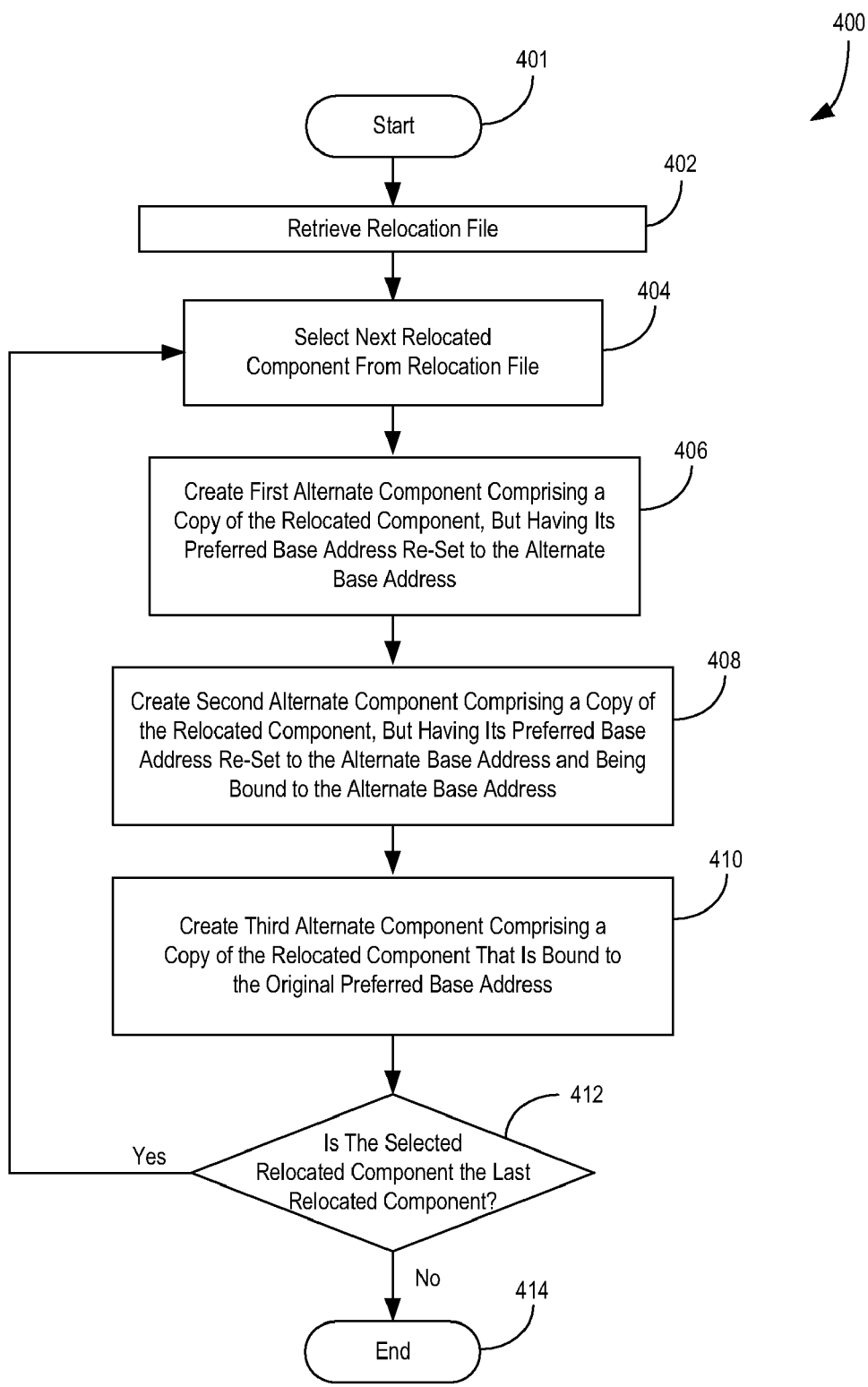
FIG. 4 is a flow chart illustrating an exemplary method for creating alternate components for use in avoiding base address collisions in accordance with certain illustrative embodiments of the present invention.

From step 212, the method moves to step 214, where the name of the conflicting component, the relocated component's filename, the new in-memory base address of the relocated component 137 and the original on-disk representation of the relocated component's preferred base address are persisted (written) to a file, referred to herein as a "relocation file," for further processing and for reporting purposes (see FIG. 3 and FIG. 4). Next, at step 216 a determination is made as to whether the selected component 137 is the last component in the list of process components. If the selected component 137 is not the last component in the list of process components, the method returns to step 208 for selection of the next component 138. The method is repeated from step 208 to step 216, as previously described, until any selected component 137, 138 is determined to be the last component in the list of process components. When a selected component 137, 138 is determined at step 216 to be the last component in the list of process components, the method returns to step 202 to await detection that another process has been loaded into memory 122.

The method 200 of FIG. 2 was described above by way of illustration only and is not intended to limit the scope of the present invention. Those skilled in the art will appreciate that there are a variety of methods to determine that the in-memory base address of a component 137, 138 is different from the on-disk representation of its preferred base-address. By way of example, the RtlQueryProcessDebugInformation function returns a structure that enumerates all of the components 137, 138 of a process 136 that have been relocated. Alternatively, one could use the "PSAPI" functions to enumerate though each component 137, 138 of each process 136 to determine its in-memory base address for comparison against the on-disk representation of its preferred base address.

FIG. 3 is a block diagram illustrating an exemplary method 300 for dynamically updating the preferred base address of a component 137, 138. The method begins at starting block 301 and advances to step 302, where a relocation file listing all relocated components of a process 136 is retrieved (e.g., from persistent storage). At step 304, a first relocated component 137 is selected from the list and it's new in-memory base address and on-disk representation of preferred base address are read from the relocation file. At step 306, a check is made to determine if the selected relocated component 137 is still loaded in memory 122. Those skilled in the art will know that the on-disk representation of a component's preferred based address cannot normally be updated while the component 137 is loaded in memory 122. Those skilled in the art will also appreciate, however, that there are techniques to "trick" an operating system 135 into allowing an on-disk representation of a preferred base address to be updated while the component 137 is loaded in memory 122.

For example, while a component 137 is loaded in memory 122, it is possible to rename the on-disk representation of the component 137, make a copy of the renamed on-disk representation of the component 137 and then rename the copy back to the original filename of the component 137. This technique causes the in-memory component and its associated on-disk representation to be assigned a new filename, while the original filename of the component is assigned to a "new" on-disk representation of that component 137. The new on-disk representation of the component 137 should no longer have an associated in-memory component, meaning that the preferred base address of the new on-disk representation can be modified. Subsequent calls by the operating system 135 for the original filename of the component, will cause the new on-disk representation to be loaded into memory 122 at the modified base address location.

Those skilled in the art will appreciate that other techniques may be employed to modify the preferred base address of an on-disk representation of a component 137. By way of example, a "copy-on-reboot" method may be employed. However, such a method may not be desirable in some circumstances because it requires that the computer 100 be restarted. As another option, the process(es) 136 to which the component 137 belongs may be terminated so that the on-disk representations can be modified.

Returning to FIG. 3, if it determined at step 306 that the selected relocated component 137 is not still in memory 122, the method can proceed directly to step 314. At step 314, the on-disk representation of the relocated component's preferred base address is changed to match the new in-memory base address of that component 137 (as determined from the relocation file loaded at step 302). However, if it is determined at step 306 that the selected component 137 is still in memory 122, the method proceeds to step 308. At step 308, the on-disk representation of the selected component 137 is renamed to a back-up filename. Then at step 309, a copy is made of the renamed on-disk representation. Next at step 310, the copy of the renamed on-disk representation is renamed back to the original filename of the relocated component 137. At step 312, a determination is made as to whether the original filename of the relocated component 137 is still associated with an in-memory component. If the original filename of the relocated component 137 is still associated with an in-memory component, the renaming "trick" of steps 308-310 is deemed to have failed and the selected relocated component 137 is momentarily skipped as the method advances to step 320 to determine if there are any other relocated components of the process 136.

However, if it is determined at step 312 that the original relocated component 137 name is no longer associated with an in-memory component, the renaming "trick" of steps 308-310 is deemed to have succeeded and the method proceeds to step 314 where the preferred base address of the on-disk representation having the original filename of the relocated component 137 is changed to match the new in-memory base address of that component 137 (as determined from the relocation file loaded at step 302). Those having ordinary skill in the art will know that the Microsoft Windows operating system provides the Application Programming Interface (API) call "RebaseImage" for the purpose of changing on-disk representations of base addresses. Other operating systems may provide similar API calls. Also familiar to those having ordinary skill in the art will be the option to bind the selected relocated component 137 to its updated on-disk representation of its preferred base address. Windows provides the API call "BindImageEx" for the purpose of binding components to base addresses and other operating systems may provide similar API calls. At step 316, the selected relocated component 137 is bound to its new preferred base address, if desired.

At step 318, a report file is written out for auditing purposes. Then, at step 320, a determination is made as to whether the selected relocated component 137 is the last relocated component of the process 136. If the selected relocated component 137 is not the last relocated component of the process 136, the method returns to step 304 for selection of the next relocated component 138. The method is repeated from step 304 to step 320, as previously described, until it is determined that any selected relocated component 137, 138 the last relocated component of the process 136. When a selected relocated component 137, 138 is determined at step 320 to be the last relocated component of the process 136, the method ends at step 322.

The optimization methods described above with respect to FIG. 3 contemplate the dynamic modification of the preferred base addresses of process components, so as to specify optimal base addresses at which no base address collisions should occur. In other embodiments, the present invention provides similar base address optimizations without modifying the on-disk representations of process components. In particular, instead of changing the preferred base address of a particular component 137, a duplicate of the component (referred to herein as an "alternate component" 137A) may be created and its preferred base address can be set to the optimal base address. In such embodiments, requests to load the component 137 into memory may be intercepted and processed in such a way as to call the alternate component 137A instead of the original component 137. The alternate component 137A may be loaded into memory 122 at its preferred base address, i.e., the optimal base address.

The Base Address Collision Monitoring program module 139 or other program module(s) may be configured for creating alternate components 137A-C, 138A-C. FIG. 4 is a block diagram illustrating an exemplary method for creating alternate components 137A-C, 138A-C in accordance with certain embodiments of the present invention. The exemplary method 400 begins at starting block 401 and proceeds to step 402, where a relocation file created during the exemplary method of FIG. 2 is retrieved from memory 122 or from persistent storage. In addition to the method of FIG. 2, other methods for creating relocation files will occur to those of skilled in the art. Again, a relocation file includes relocation information for all components 137, 138 that were relocated to new in-memory base addresses (referred to hereinafter as "alternate base addresses") due to base address collisions.

Those skilled in the art will appreciate that not all of the relocation information collected according to the exemplary method of FIG. 2 may be required for the creation of alternate components 137A-C, 138A-C. At a minimum, the relocation file should identify the filename of each relocated component 137, 138 and its alternate base address. Conversely, the same relocation information and/or other relocation information as described with respect to the method of FIG. 2 may be desired for reporting, analysis and/or other purposes. Accordingly, the same, more or less relocation information as collected according to the method of FIG. 2 may be included in a relocation file used in connection with this method 400 and similar methods.

After the relocation file is retrieved, the first relocated component 137 listed therein is selected at step 404. Then at step 406, a first alternate component 137A is created by creating a copy of the on-disk representation of the relocated component 137 and resetting the preferred base address of the copy to be the alternate base address of the relocated component 137. As described previously, Windows provides the API call "RebaseImage" for the purpose of changing on-disk representations of base addresses. Other operating systems may provide similar API calls. For convenience, the on-disk representation of the relocated component 137 may be referred to herein as the "original component." The alternate component 137A is assigned a filename that is distinct from the filename of the original component 137 and is stored in persistent storage.

Preferably, a logical naming convention or other file identification convention is used to distinguish the different types of alternate components 137A-C, 138A-C. For example, by convention a certain type of filename or other identifier may be used to identify each different alternate component type. Various suitable naming conventions will occur to those of ordinary skill in the art, all of which are included within the scope of the present invention. In certain embodiments, as will be described below, the alternate component 137A may be physically or logically linked to the original component 137. Otherwise, a look-up table or other file may be maintained to record the association between and the persistent storage locations of the alternate component 137A and the original component 137.

In certain embodiments of the present invention, only a single alternate component 137A may be created for each original component 137. However, the exemplary method 400 contemplates the creation of multiple alternate components 137A-C per original component 137, each alternate component 137A-C offering different levels or types of optimization. Thus, at step 408, a second alternate component 137B is created comprising, for example, a duplicate of the original component 137 having its preferred base address re-set to the component's alternate base address, and being bound to the alternate base address. As described previously, Windows provides the API call "BindImageEx" for the purpose of binding components to base addresses. Other operating systems may provide similar API calls.

Next at step 410, a third alternate component 137C is created. The third alternate component 137C may be, for example, a duplicate of the original component 137 that is bound to the component's original preferred base address. The third alternate component may not have its preferred base address re-set to the alternate base address of the original component 137 because, in some cases, any base address collision may be resolved by relocating a different component or through other methods. This exemplary third alternate component 137C may also be used in embodiments where alternate components 137A-C, 138A-C are created for every component 137, 138 of a process 136, not only those that have been determined to result in a base address collision.

The second alternate component 137B and the third alternate component 137C were described above by way of example only. Those skilled in the art will appreciate that other types of optimizations may be used in the creation of alternate components 137A-C and any number of alternate components may be created. Multiple alternate components 137A-C provide differing levels and types of optimizations, each of which may be useful in particular situations. As will be described in further detail below, the use of multiple alternate components 137A-C provides flexibility for performing optimizations on a component-by-component basis.

At step 412, a determination is made as to whether the selected relocated component 137 is the last relocated component listed in the relocation file. If the selected relocated component 137 is not the last relocated component, the method returns to step 404 for selection of the next relocated component 138. The method is then repeated from step 404 to step 412, in the manner previously described, until it is determined that any selected relocated component 137, 138 is the last relocated component listed in the relocation file. When a selected relocated component 137, 138 is determined at step 412 to be the last relocated component, the method ends at step 414.

The exemplary method 400 described above for creating alternate components 137A-C, 138A-C contemplates the existence of a relocation file that may be stored in memory 122 or in persistent storage so that the alternate components 137A-C, 138A-C may be created at a later time, such as a time when the computer system 100 is idle. In certain other embodiments, however, it may be desirable to create one or more alternate components 137A-C, 138A-C "on-the-fly" each time an original component 137, 138 is involved in a base address collision. In such embodiments, a relocation file may not be a prerequisite to creating alternate components 137A-C, 138A-C. Accordingly, the above described method 400 is provided by way of example only and other methods for creating alternate components 137A-C, 138A-C are considered to be within the scope of the present invention.

Figure 5:
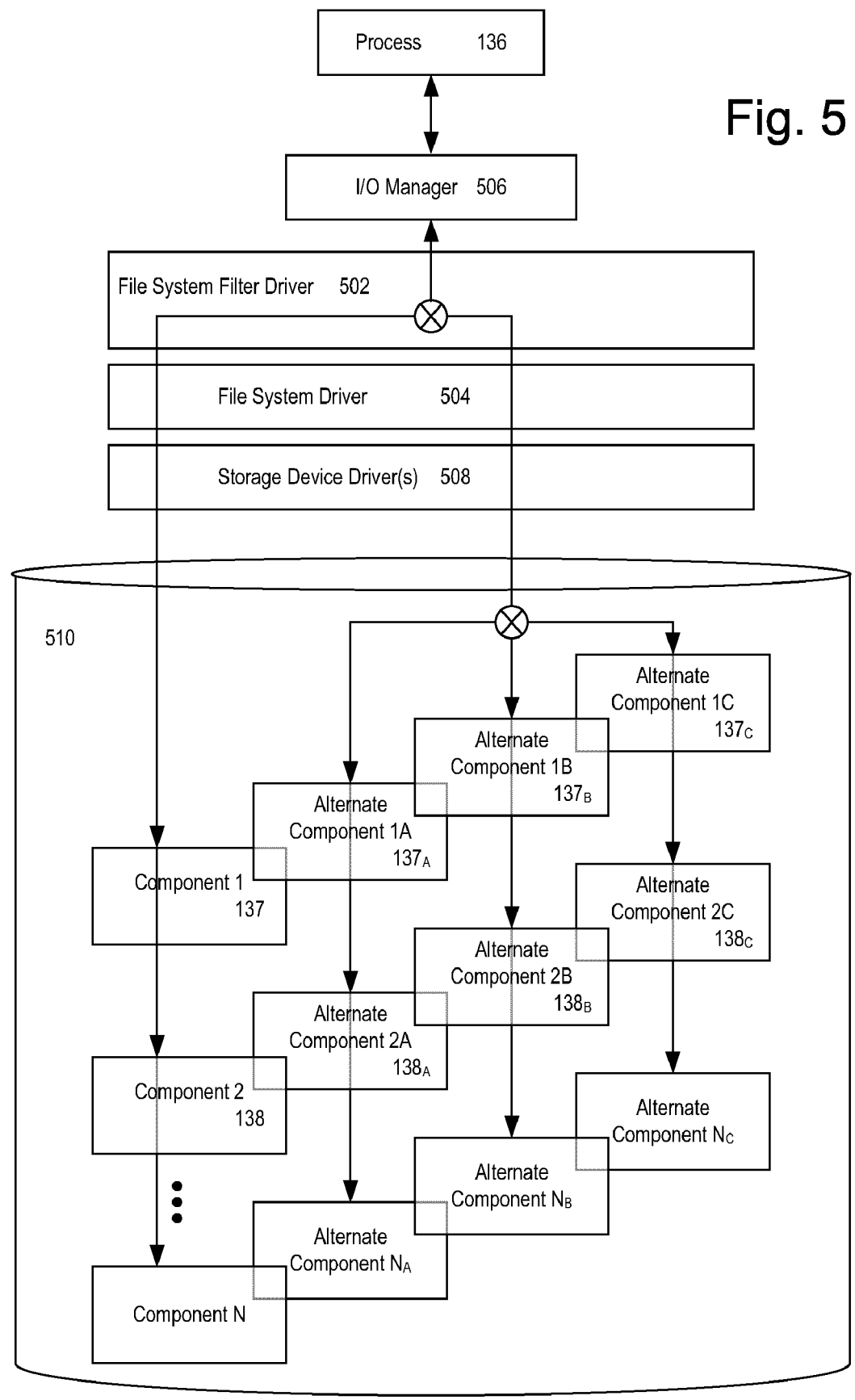
FIG. 5 is a block diagram providing an abstract illustration of an exemplary file system configuration in accordance with certain illustrative embodiments of the present invention.

FIG. 5 is a block diagram illustrating, in the abstract, an exemplary file system configuration in accordance with certain embodiments of the present invention. In this example, three alternate components 137A-C, 138A-C are associated with each original component 137, 138, respectively. Alternate components 137A-C, 138A-C may be stored in persistent storage along with the original components 137, 138, or at any other feasible local or remote storage location. Base address collisions may be avoided by loading an alternate component 137A-C, 138A-C into memory 122 in response to a request to execute an original component 137, 138. To accomplish this, an Alternate Component Filter 160 may be provided to intercept commands relating to the original component 137, 138, filter those commands and "re-directed" certain of those commands, when appropriate, to an alternate component 137A-C, 138A-C.

In certain embodiments, the Alternate Component Filter 160 is implemented as a file system filter driver 502. The concept of a file system filter driver 502 is well known in the art. Generally, a file system filter driver 502 attaches to a file system driver 504 and intercepts requests directed to the file system driver 504. A file system filter driver 502 allows the addition of functionality beyond that provided by the file system driver 504. A file system filter driver 502 might use the services of the file system driver 504 or the services of other kernel-mode drivers to provide the additional functionality. Those skilled in the art will understand how to design and implement a file system filter driver 502 to accomplish the functions described herein and therefore no particular programming techniques related thereto are described herein.

The exemplary configuration shown in FIG. 5 involves an operating system 135 that describes file I/O services by way of discrete packets called I/O Request Packets ("IPR"). As an example, an IRP may describe file-related services known as "ReadFile" and "CreateFile." When a process 136 requests that a particular file (e.g. a process component 137, 138) be accessed from persistent storage, the request is communicated to an I/O Manager 506. The I/O Manager 506 invokes one or more file-related services by creating an appropriate IRP. The I/O Manager 506 prepare the resulting IRP for delivery to the file system driver 504 responsible for managing the particular file. In the example of FIG. 5, there is only one file system driver 504, but other configurations with multiple file system drivers 504 and/or multiple file system filter drivers 502 are possible.

In the exemplary model of FIG. 5, the operating system 135 may use device objects to represent a device, such as a persistent storage device 510. Those skilled in the art will appreciate that device objects serve as the target of all operations on the device. Devices are usually represented by multiple device objects, one for each driver in the driver stack that handles I/O requests for the device. The device objects for a device are organized into a device stack. Whenever an operation is performed on a device, the system passes an IRP data structure to the driver for the top device object in the device stack. Each driver either handles the IRP or passes it to the driver that is associated with the next-lower device object in the device stack.

Thus, the I/O Manager 506 would typically pass an IRP to the file system driver 504 by locating a device object of the file system driver 504. The file system filter driver 502, however, creates device objects that attach to (i.e., sit on top of within the device stack) the device objects of the file system driver 504. Thus, in attempting to pass IRP to the driver that is associated with the next-lower device object in the device stack, the I/O Manager 506 will route IRP to the file system filter driver 502. The file system filter driver 502 may be configured to receive and inspect all IRP directed to the file system driver 504.

The file system filter driver 502 may be further configured to identify those IRP that request that an original component 137,138 be opened for execution. Any IRP that do not request than an original component 137,138 be opened for execution are passed on to the file system driver 504 to be processed as normal. However, those IRP that request that an original component 137,138 be opened for execution are modified to substitute an identifier (e.g., a filename or pointer) of an alternate component 137A-C, 138A-C for an identifier of the original component 137,138. The modified IRP is then passed to the file system driver 504 for further processing. Any IRP received by the file system driver 504 are eventually passed to the storage device driver 508, which interacts with the persistent storage device 510 to retrieve the component or other file identified in the IRP.

The file system filter driver 502 may substitute identifiers of alternate components 137A-C, 138A-C for identifier of original components based on associations stored in a lookup table or by way of any other process that may occur to those of skill in the art. In certain embodiments, the file system filter driver 502 may be configured to substitute a default type of alternate component 137A, 138A for an original component 137,138, unless a particular exception occurs.

By way of example, alternate components 137A-C, 138A-C may be classified by type, with each type being optimized in a different way. A certain type of alternate component 137A, 138A may then be designated as the "default" type to be loaded into memory 122 when a corresponding original component 137, 138 is called. An "exceptions table" or other look-up table may be maintained to list those situation when an alternate component 137B-C, 138B-C other than the default alternate component 137A, 138A is to be loaded into memory 122.

An exceptions table may specify a particular alternate component 137B, 138B to be loaded into memory upon the occurrence of an exception. Alternatively, multiple tiers of default alternate component types may be specified (e.g., first default, second default, third default, etc.) and conditions may be set for determining which tier of default alternate component type should be loaded into memory. As mentioned above, naming conventions or other file identification conventions may be used to distinguish the different types of alternate components 137A-C, 138A-C.

Similar to the concept of an exception table, an "exclusion table" may also be created. An exclusion table may specify certain components 137, 138 which are not to be optimized for some reason. By way of example, in certain embodiments it may be desirable to optimize only system components but not any other components. There may be many other reasons why it might be preferable not to optimize one or more certain components. The Base Address Collision Monitoring program module 136 or other program module may be configured to consult the exclusion table prior to creating alternate components.

An exceptions table and/or an exclusions table could thus be used to "turn off" optimizations for some or all components, as desired. In addition, optimization methods of the present invention could be "tuned off" by disabling the file system filter driver 502, disabling the file system filter driver 502 would obviously result in all original components 137, 138 being loaded into memory as requested. The ability to "turn off" the optimizations of the present invention allows the state of the computer system to be returned to a pre-optimization state, which may be desirable for bug-fixing or other problem solving activities.

Those skilled in the art will appreciate that additional functionality may need to be added to the file system filter driver 502 or otherwise provided in order to maintain consistency between alternate components 137A-C, 138A-C and original components 137, 138. In particular, when an original component 137, 138 is modified, corresponding modifications must be made to any associated alternate components 137A-C, 138A-C. Several methods for maintaining consistency between alternate components 137A-C, 138A-C and original components 137, 138 will occur to those of skill on the art. For example, any existing alternate components 137A-C, 138A-C may be deleted when it is determined that an associated original component 137, 138 has been modified. When the alternate components 137A-C, 138A-C are deleted, new alternate components may be created by copying the modified original component and re-setting the preferred base address of the copy to the previously determined optimal base address of the original component and/or performing other previously mentioned optimizations. As another option, the modified original component may be left without any corresponding alternate components for the time being, and the optimization process described herein may be repeated from the beginning (see FIG. 2, for example) to create one or more new alternate components when the original component 137, 138 is next loaded into memory 122.

The file system, NTFS, used by certain operating systems 135, such as Windows NT, Windows 2000, Windows XP, and Windows 2003 includes native functionality known as "alternate data stream." In certain embodiments, alternate data streams may be particularly useful for implementing alternate components 137A-C, 138A-C. Alternate data streams are hidden files that are linked to normal visible files (referred to herein as "original files"). Alternate data streams are not limited in size and there can be more than one alternate data stream linked to an original file. An alternate data stream can include any type of data, including executable code.

When an original file is created, the data for that original file is written to an unnamed data stream associated with the filename of the original file. Other named data streams (i.e., "alternate data streams") can be created "behind" the unnamed data stream. The file system is configured to maintain a record of attributes for each original file, which may include pointers to each alternate data stream, effectively linking that alternate data streams to the original file. Those skilled in the art will be familiar with the commands and techniques for creating alternate data streams representing alternate components 137A-C, 138A-C.

Alternate data stream functionality thus provides a suitable mechanism for managing multiple related alternate components 137A-C as a single unit. Through the use of alternate data stream functionality, no additional logic needs to be provided for managing alternate components 137A-C, 138A-C. A file system filter driver 502 may be configured for substituting an identifier (e.g., a filename) of an alternate data stream representing an alternate component 137A-C, 138A-C for an identifier of an original file representing an original component 137, 138, when desired. Alternate data streams are automatically deleted when the corresponding original file is modified. Thus, there is no need to update alternate data streams representing alternate components 137A-C, 138A-C when corresponding original components 137, 138 are modified. If an alternate data stream representing an alternate component 137A-C, 138A-C is deleted, the optimization process described herein is repeated from the beginning (see FIG. 2) and one or more new alternate components 137A-C, 138A-C are created the next time the original component 137, 138 is loaded into memory 122.

Figure 6:
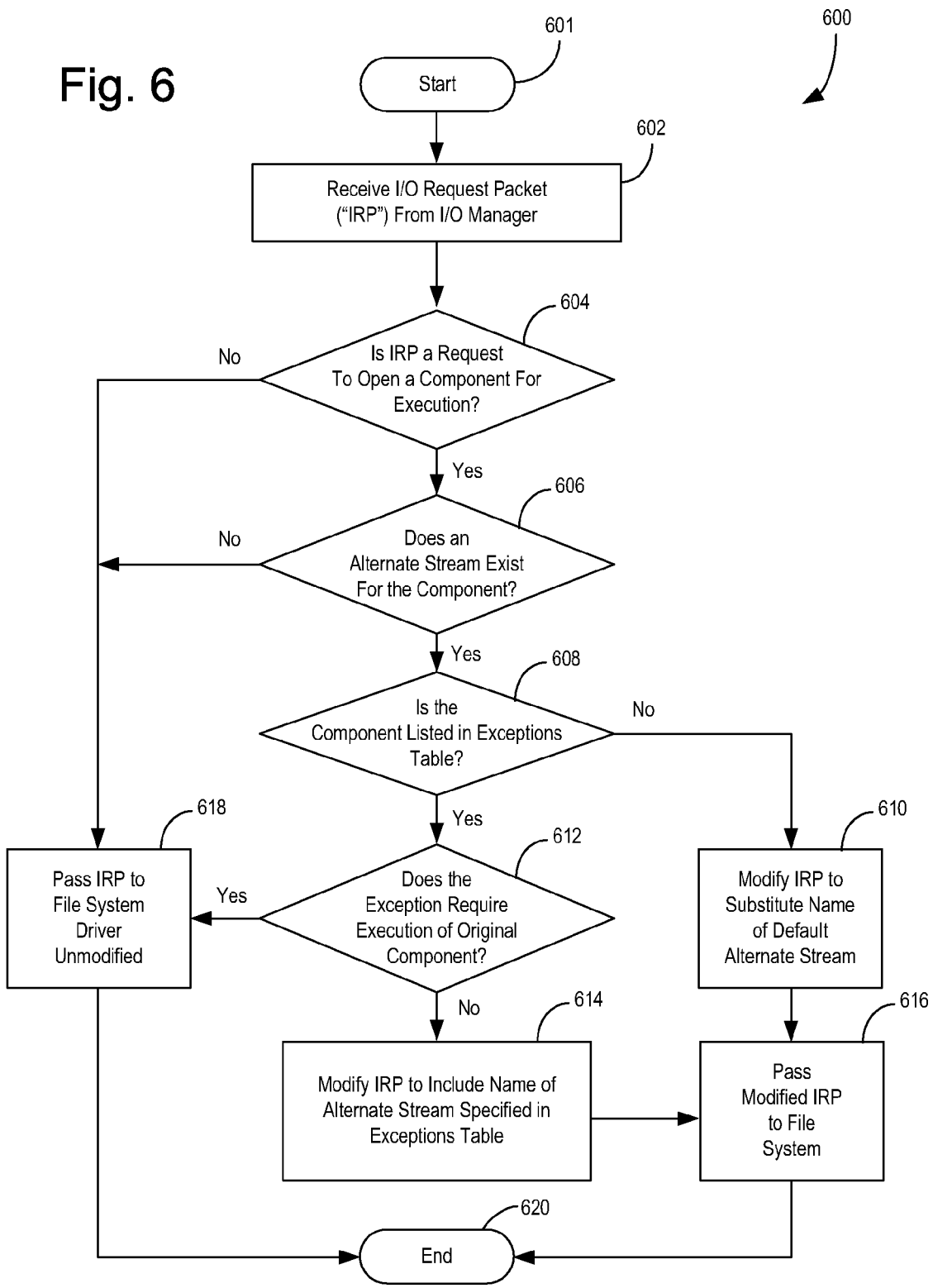
FIG. 6 is a flow chart illustrating an exemplary file system filtering process for loading alternate components into memory in place of original components, in accordance with certain illustrative embodiments of the present invention.

FIG. 6 is a block diagram illustrating an exemplary file system filtering process for loading alternate components 137A-C, 138A-C into memory in place of original components 137, 138, so as to avoid base address collisions. The exemplary method 600 may be performed by an Alternate Component Filter 160 or similar program module(s), which may be implemented as a file system filter driver 502 in certain embodiments. The exemplary method 600 begins at starting block 601 and proceeds to step 602, where an IRP is received from an I/O manager 506. Next at step 604, a determination is made as to whether the IRP is a request to open an original component 137 for execution. If the IRP is not a request to open an original component 137 for execution, the IRP is passed, unmodified, to the file system driver 506 (or the next lowest driver in the stack) at step 618. From step 618, the method ends at step 620.

However, if the IRP is a request to open an original component 137 for execution, the method advances to step 606, where a determination is made as to whether at least one alternate component 137A-C exists corresponding to the original component 137. If no alternate component 137A-C exists corresponding to the original component 137, the IRP is passed, unmodified, to the file system driver 504 (or other appropriate portion of the file system) at step 618. If an alternate component 137A-C does exist corresponding to the original component 137, the method proceeds to step 608, where an exceptions table is examined to determine whether the original component 137 is listed therein.

If the original component 137 is not listed in the exceptions table, the method moves to step 610, where the IRP data structure is modified to substitute therein an identifier (e.g., filename or pointer) of a default alternate component 137A for the identifier of the original component 137. Again, there may be multiple alternate components 137A-C corresponding to the original component 137. Such multiple alternate components 137A-C may be distinguished according to the type of optimization performed thereon. For example, a first type of alternate component 137A may be optimized by re-setting its preferred base address to its optimal base address; a second type of alternate component 137B may be optimized by re-setting its preferred base address to its optimal base address and binding the alternate component 137B to the optimal base address; and a third type of alternate component 137C may be optimized by binding the alternate component 137C to its original preferred base address. One type of alternate component 137A may be designated as the default type to be loaded into memory 122 unless an exception occurs. From step 610, the method advances to step 616, where the modified IRP is passed to the file system driver 504, or other appropriate portion of the file system, for processing. From step 616, the method ends at step 620.

Returning to step 612, if the original component 137 is determined to be listed in the exceptions table, the method moves to step 612, where a determination is made as to whether the exception requires execution of the original component 137. If the exception requires execution of the original component 137, the method proceeds to step 618, where the IRP is passed, unmodified, to the file system driver 504 (or other appropriate portion of the file system.) If the exception does not require execution of the original component 137, the method advances to step 614, where the IRP data structure is modified to substitute therein an identifier of the alternate component 137B specified by the exception for the identifier of the original component 137. As mentioned previously, an exception may specify that a particular alternate component 137B or a particular type of alternate component 137B (e.g., second default type or third default type, etc.) be substituted for the original component 137. From step 614, the method advances to step 616, where the modified IRP is passed to the file system driver 504, or other appropriate portion of the file system, for processing. From step 616, the method ends at step 620.

Those skilled in the art will appreciate that the exemplary method 600 described above represents but one method for substituting alternate components for original components in order to avoid base address collisions. The use of an exceptions table to identify only those situations in which a first default type of alternate component should not be substituted for an original component is believed to be an efficient method for handling such substitutions. However, the use of an exceptions table is not required in other embodiments. Other methods for substituting alternate components for original components will occur to those of ordinary skill in the art and are therefore considered to be within the scope of the present invention.

It should be appreciated that the optimization techniques of the present invention may be implemented on stand-alone computing devices and/or in networked computing environments. For example, in a client-server environment, the client device and/or the server may execute the exemplary Base Address Collision Monitoring program module 139 and/or the exemplary Alternate Component Filter 160 for optimizing process components to avoid base address collisions. As another example, in a thin-client or terminal-server environment, the optimization techniques of the present invention may be performed at the terminal server where processes are executed for the terminal devices. In fact, any computing device which performs the function of loading process components 137, 138 from persistent storage into memory 122 may benefit from the optimization techniques of the present invention.

Figure 7:
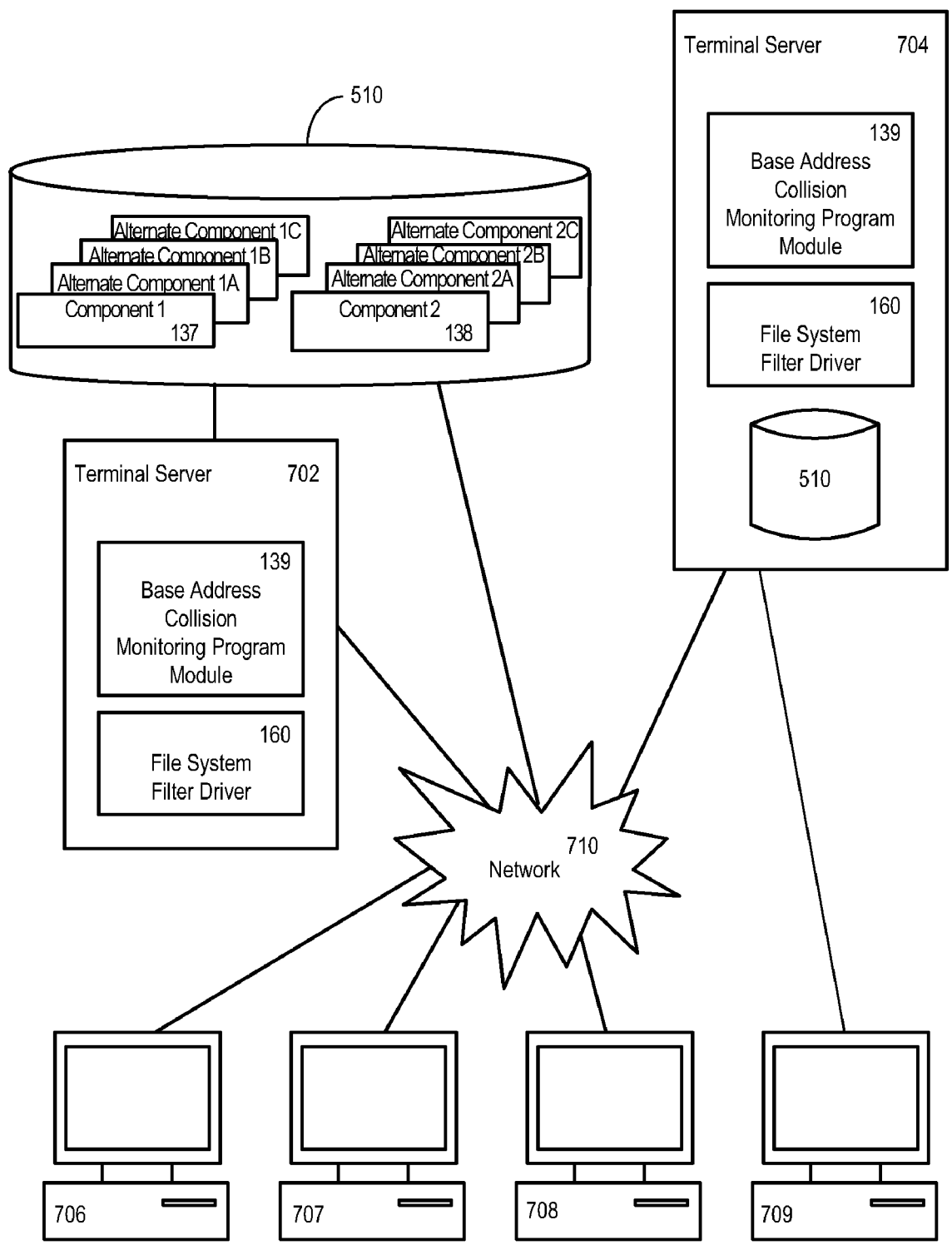
FIG. 7 is a block diagram illustrating an exemplary terminal server environment for implementation of certain embodiments of the present invention.

FIG. 7 is a block diagram illustrating an exemplary terminal server environment 700 for implementation of certain embodiments of the present invention. In the exemplary terminal server environment 700, terminal servers 702, 704 host and execute processes 136a-c for each terminal 706-709. Each terminal 706-709 executes client software that displays the user interface generated by the terminal server 702, 704 and transmits user input commands to the terminal server 702, 704. The terminal server 702, 704 and the terminals 706-709 communicate using an appropriate protocol for exchanging user interface data and user input commands. The terminals 706-709 can be personal computers 100, other workstations, laptop or handheld computing devices, etc. One terminal 706-709 may be connected to multiple terminal servers 702, 704.

A terminal server 702, 704 executes multi-user server software that provides the ability to host multiple, simultaneous client sessions. Thus, a terminal server 702, 704 is capable of running many processes 136a-c simultaneously for one or more terminals 706-709. The terminal server software is designed to share common components 137, 138 among as many processes 136a-c as possible, so as to reduce consumption of memory and processing resources. However, each time any process 136a is required to write to or otherwise modify a shared component 137, a new copy of that component 137 must be created so as not to disturb any other processes 136b-c that are already running.

During execution, a copy of a first process 136a and its required components 137 are loaded into memory 122 (i.e., physical memory) at their preferred base addresses and are then mapped to corresponding virtual memory addresses in the virtual memory space allocated to the first process 136a. Ideally, the same copy of any components 137 shared by a second process 136b would be mapped from the same physical memory location to the corresponding virtual memory addresses in the virtual memory space allocated to the second process 136b. However, mapping a shared component 137 to the virtual memory space of the second process 136b may result in a base address collision if another component 138 is already mapped to the desired virtual memory address.

In the terminal server environment, a base address collision again results in a relocation of the component 137 that is being mapped into virtual memory space. The relocation requires that the component 137 be modified to specify its new relocated base address. As mentioned, the need by one process 136b to modify a component 137 means that a separate copy of that component 137 must be created and so modified, so as to not disturb the other copy that is used by other processes 136a. The more copies of a component 137 that are created, the more physical memory is consumed and the slower the terminal server performs. In addition, the more processes 136a-c executed simultaneously by a terminal server 702, 704, the more often base address collisions will occur.

Therefore, the terminal server environment may achieve significant performance gains as a result of the optimization techniques of the present invention. In certain exemplary embodiments, a terminal server 702, 704 may be configured to execute a Base Address Collision Monitoring program module 139 for monitoring base address collisions and creating alternate components in response thereto. In such embodiments, each terminal server 702, 704 also executes an Alternate Component Filter 160 for filtering commands related to original components. As described above, commands for loading a process component 137 into memory 122 for execution will be processed by the Alternate Component Filter 160 in such a way as to load an alternate component 137*a-c* instead. Alternate components 137*a-c* may be optimized, as previously explained, to load at an optimal base address.

In the terminal server environment, determination of the optimal base address for loading of an alternate component may be an iterative process. For example, in certain embodiments, the base address to which a component 137 is relocated as a result of a base address collision may be chosen as an optimal base address for an alternate component 137*a*. The optimal base address may reduce or eliminate base address collisions based on the current performance conditions of the terminal server 702, 704. However, as new processes 136*c* are executed by the terminal server 702, 704, the alternate component 137*a* may become involve in another base address collision when being mapped to a new virtual memory space. In such a case, the optimization methods of the present invention would be performed again to determine a new optimal base address for the alternate component 137*a*.

In some embodiments, the optimization method of the present invention may be performed continuously with respect to a particular alternate component 137*a*, in an attempt to find its "true" optimal base address. However, in other embodiments, the optimizations may be discontinued as long as a certain level of performance improvement is realized. In other words, an alternate component 137*a* may be given an new base address that is not its "true" optimal base address because some base address collisions will occur in certain situations. However, if it is determined that the new base address of the alternate component 137*a* will result in an acceptable or desired percentage reduction in base address collisions, further base address optimizations may be deemed unnecessary.

As mentioned, naming conventions may be used to manage multiple alternate components 137*a-c*. In certain embodiments, naming convention can include or be extended to include identifiers for each terminal device 706-709. In this way, alternate components may be created to be specific to a given terminal 706-709. Thus, different optimizations could be performed for different terminals 706-709. As a result, more precise and relevant optimizations may be made on a terminal by terminal basis. The optimizations of the present invention could also be "turned off" with respect to one or more terminal by creating an appropriate exceptions table for the process components identified with that terminal.

Those skilled in the art will appreciate that the foregoing description of the invention was provided by way of example only and that many other modifications, features, embodiments and operating environments of the present invention are possible. It should also be appreciated that the exemplary aspects of the present invention as described above are not intended to be interpreted as required or essential elements of the invention, unless explicitly stated otherwise. Accordingly, the foregoing relates only to certain embodiments of the invention and numerous changes may be made thereto without departing from the spirit and scope of the invention as defined by the following claims.

The invention claimed is:

1. A method for avoiding base address collisions during loading of a component of a software process into a memory of a computer system, comprising the steps of:
   detecting that a copy of the component of a software process has been loaded into the memory of the computer system at an in-memory address that is not a preferred base address of the component, wherein the preferred base address is specified in an on-disk representation of the component stored in a persistent storage of the computer system; and
   in response to determining that the copy of the component has been loaded at the in-memory address that is not the preferred base address, changing the preferred base address in the on-disk representation of the component.

2. A computer readable medium having stored thereon computer executable instructions for performing the method of claim 1.

3. The method of claim 1, wherein detecting that the copy of the component has been loaded at the in-memory address that is not the preferred base address comprises detecting that a conflicting component caused the copy of the component to be relocated to the in-memory address.

4. The method of claim 1, wherein changing the preferred base address in the on-disk representation of the component comprises the step of calling an Application Programming Interface function programmed to change the preferred base address of the on-disk representation of the component.

5. The method of claim 4, wherein the Application Programming Interface comprises the RebaseImage provided by the Microsoft Windows operating system.

6. The method of claim 1, wherein changing the preferred base address in the on-disk representation of the component comprises replacing the preferred base address with a new base address.

7. The method of claim 6, wherein the new base address is equivalent to the in-memory base address.

8. A system for avoiding base address collisions during loading of a component of a software process, comprising:
   a persistent storage for storing an on-disk representation of the component, the on-disk representation of the process component specifying a preferred base address for the component; a memory being logically divided into a plurality of in-memory addresses; and a processor for executing computer-executable instructions for:
   detecting that a copy of the component has been loaded into the memory at an in-memory address that is not the preferred base address, and
   in response to detecting that the copy of the component has been loaded at the in-memory address that is not the preferred base address, changing the preferred base address in the on-disk representation of the component.

9. The system of claim 8, wherein detecting that the copy of the component has been loaded at the in-memory address that is not the preferred base address comprises determining that a conflicting component caused the copy of the component to be relocated to the in-memory base address.

10. The system of claim 8, wherein changing the preferred base address in the on-disk representation of the component comprises calling an Application Programming Interface function programmed to change the preferred base address of the on-disk representation of the component.

11. The system of claim 10, wherein the Application Programming Interface comprises the RebaseImage API provided by the Microsoft Windows operating system.

12. The system of claim 8, wherein changing the preferred base address in the on-disk representation of the component comprises replacing the preferred base address with a new base address.

13. The system of claim 12, wherein the new base address is equivalent to the in-memory base address.

* * * * *